(12) United States Patent
Hahn

(10) Patent No.: US 10,708,916 B2
(45) Date of Patent: Jul. 7, 2020

(54) AIR-TIME CAPACITIES

(71) Applicant: Hewlett Packard Enterprise Development LP, Houston, TX (US)

(72) Inventor: Dongwoon Hahn, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/762,595

(22) PCT Filed: Sep. 29, 2015

(86) PCT No.: PCT/US2015/052918
§ 371 (c)(1),
(2) Date: Mar. 23, 2018

(87) PCT Pub. No.: WO2017/058169
PCT Pub. Date: Apr. 6, 2017

(65) Prior Publication Data
US 2018/0288767 A1    Oct. 4, 2018

(51) Int. Cl.
*H04W 4/00* (2018.01)
*H04W 72/04* (2009.01)
(Continued)

(52) U.S. Cl.
CPC ...... *H04W 72/0453* (2013.01); *H04B 17/345* (2015.01); *H04W 16/10* (2013.01); *H04W 88/12* (2013.01)

(58) Field of Classification Search
CPC .... H04B 17/345; H04W 88/12; H04W 16/10; H04W 72/0453; H04W 72/04
See application file for complete search history.

(56) References Cited

U.S. PATENT DOCUMENTS 8,462,751 B1   6/2013 Dehghan et al.
10,104,575 B1 * 10/2018 Linkola ............ H04W 28/0289
(Continued)

FOREIGN PATENT DOCUMENTS

EP    2637464    9/2013

OTHER PUBLICATIONS

International Search Report and Written Opinion, dated Jul. 8, 2016, PCT/US2015/052918 dated Sep. 29, 2015, Korean Intellectual Property Office, 14 Pgs.
(Continued)

*Primary Examiner* — Abdelillah Elmejjarmi
(74) *Attorney, Agent, or Firm* — Hewlett Packard Enterprise Patent Department

(57) ABSTRACT

Examples disclosed herein relate, among other things, to a controller communicatively coupled to a plurality of radios, where each radio may be associated with a wireless channel. The controller may obtain, for each radio in the plurality of radios, a set of parameters associated with the radio's communication through the wireless channel associated with the radio, and determine an air-time capacity of the radio based on the set of parameters. The controller may also calculate a combined air-time capacity of the plurality of radios based on the air-time capacity of each of the plurality of radios, and based on the combined air-time capacity, determine whether to assign a different wireless channel to at least one of the plurality of radios.

13 Claims, 4 Drawing Sheets

(51) Int. Cl.
*H04W 16/10* (2009.01)
*H04B 17/345* (2015.01)
*H04W 88/12* (2009.01)

(56) References Cited

U.S. PATENT DOCUMENTS

| | | | |
|---|---|---|---|
| 2005/0078666 A1* | 4/2005 | Beshai | H04L 45/62 370/380 |
| 2008/0107069 A1 | 5/2008 | Wu et al. | |
| 2008/0151751 A1 | 6/2008 | Ponnuswamy et al. | |
| 2008/0316982 A1 | 12/2008 | Murty et al. | |
| 2009/0316766 A1 | 12/2009 | Korobkov et al. | |
| 2011/0188402 A1 | 8/2011 | Behroozi et al. | |
| 2011/0286418 A1 | 11/2011 | Liu et al. | |
| 2013/0090125 A1* | 4/2013 | Clifton | H04W 16/14 455/452.1 |
| 2014/0036787 A1 | 2/2014 | Ganu et al. | |
| 2014/0269280 A1 | 9/2014 | Bhanage et al. | |
| 2014/0341158 A1 | 11/2014 | Farricker | |
| 2015/0208426 A1* | 7/2015 | Jetcheva | H04W 72/0486 370/254 |
| 2016/0029404 A1* | 1/2016 | Aryafar | H04W 72/1231 370/277 |

OTHER PUBLICATIONS

Jong-Ok Kim et al., "Airtime-based Link Aggregation at the Co-existence of WiMax and WiFi," PIMRC '07, Sep. 3-7, 2007, pp. 1-5, IEEE.

Kim Jong-Ok et al., "Traffic Distribution Based on Airtime-fairness for Multi-radio Cognitive Networks," Jan. 18, 2007, 1 page.

Sana Ghannay et al., "Multi-radio Multi-Channel Routing Metrics in IEEE 802.11s-based Wireless Mesh Networks—And the Winner Is . . . ," Nov. 3-6, 2009, 8 Pgs. IEEE.

International Preliminary Report on Patentability received for PCT Application No. PCT/US2015/052918, dated Apr. 12, 2018, 11 pages.

Extended European Search Report and Written Opinion received for EP Patent Application No. 15905559.9, dated Apr. 10, 2018, 9 pages.

Ahmed N et al., "SMARTA: A Self-Managing Architecture for Thin Access Points", Proceedings Conext '06 Proceedings of the 2006 ACM Conext Conference, ACM, New York, NY. USA, Dec. 4, 2006, pp. 1-12.

* cited by examiner

AIR-TIME CAPACITIES

BACKGROUND

A wireless network, such as a wireless local-area network (WLAN) may include one or more radios such as wireless routers, and client devices such as laptops, smartphones, or other types of computing devices with wireless connectivity. Each radio may communicate with a number of client devices via a wireless channel having a certain primary channel and bandwidth. The wireless network may also include a controller that may communicate with the radios, for example, in order to receive real-time information from the radios, configure the radios, and perform other functions.

BRIEF DESCRIPTION OF THE DRAWINGS

The following detailed description references the drawings, wherein.

DETAILED DESCRIPTION

As mentioned above, a wireless network may include a plurality of radios communicating with a plurality of client devices via a plurality of wireless channels. Because the number of available wireless channels is generally limited, some radios may be assigned the same wireless channel, which may cause communication interferences and reduce the effective bandwidth available to some radios and client devices. Each radio may be capable of independently changing its wireless channel to a wireless channel with fewer interferences, but such a change may cause new interferences, and may not improve the performance of the wireless network as a whole. In addition, having the radios select their own wireless channels may result in frequent channel and power changes across the network, as a change in one radio may trigger a change in another radio, and so on. In some situations, these changes may not converge within reasonable time, which may cause significant system overhead, reduce the wireless network's overall performance, increase its combined power consumption, etc.

Examples discussed herein discuss, among other things, a controller. The controller may be communicatively coupled to a plurality of radios, where each radio may be associated with a wireless channel. The controller may obtain, for each radio in the plurality of radios, a set of parameters associated with the radio's communication through the wireless channel associated with the radio, and determine an air-time capacity of the radio based on the set of parameters. The controller may also calculate a combined air-time capacity of the plurality of radios based on the air-time capacity of each of the plurality of radios, and based on the combined air-time capacity, determine whether to assign a different wireless channel to at least one of the plurality of radios. Using these and other examples, the total amount of air time available to the radios and the client devices of the wireless network, as well as the aggregate system throughput, may be increased.

Figure 1:
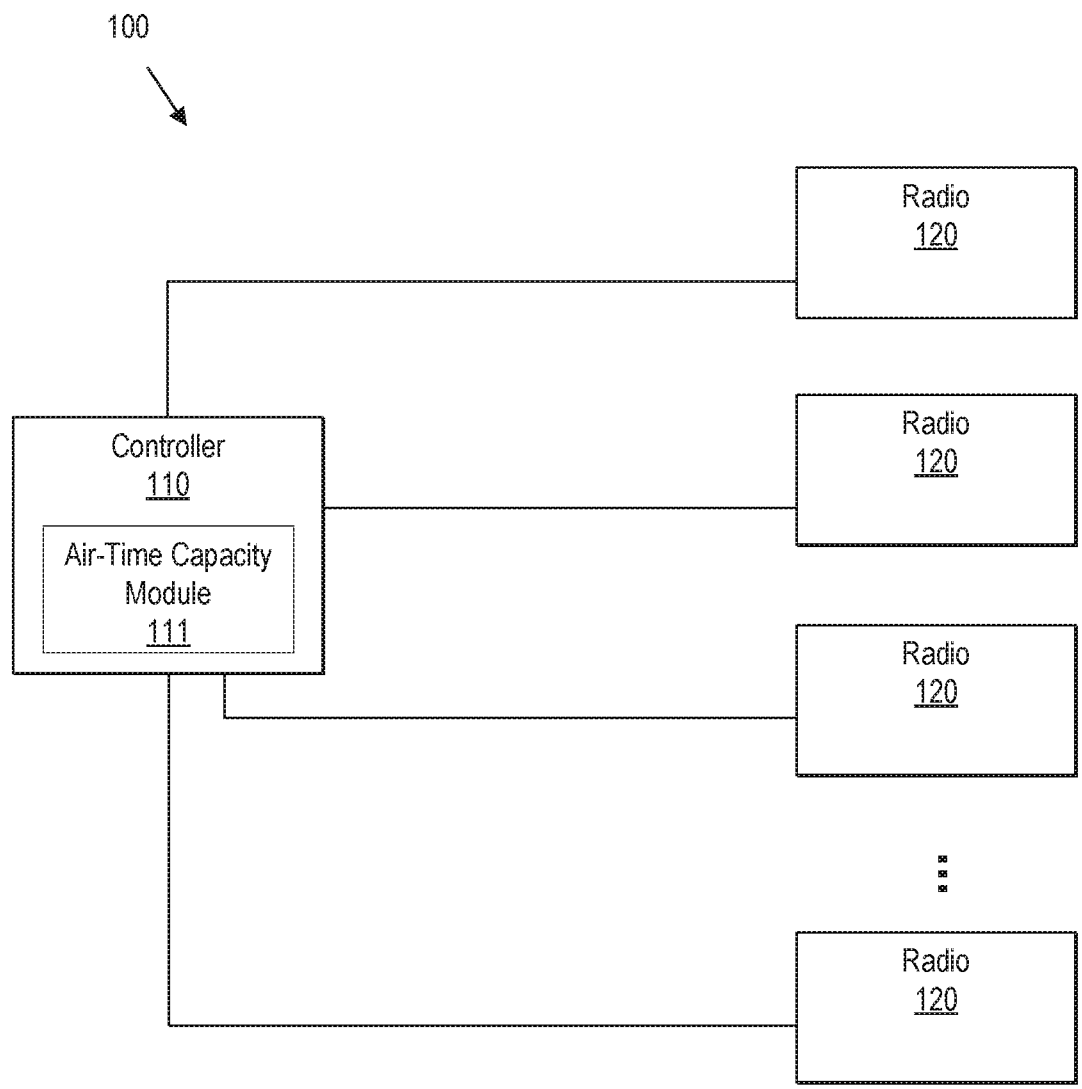
FIG. 1 is a block diagram of an example network.
Figure 2:
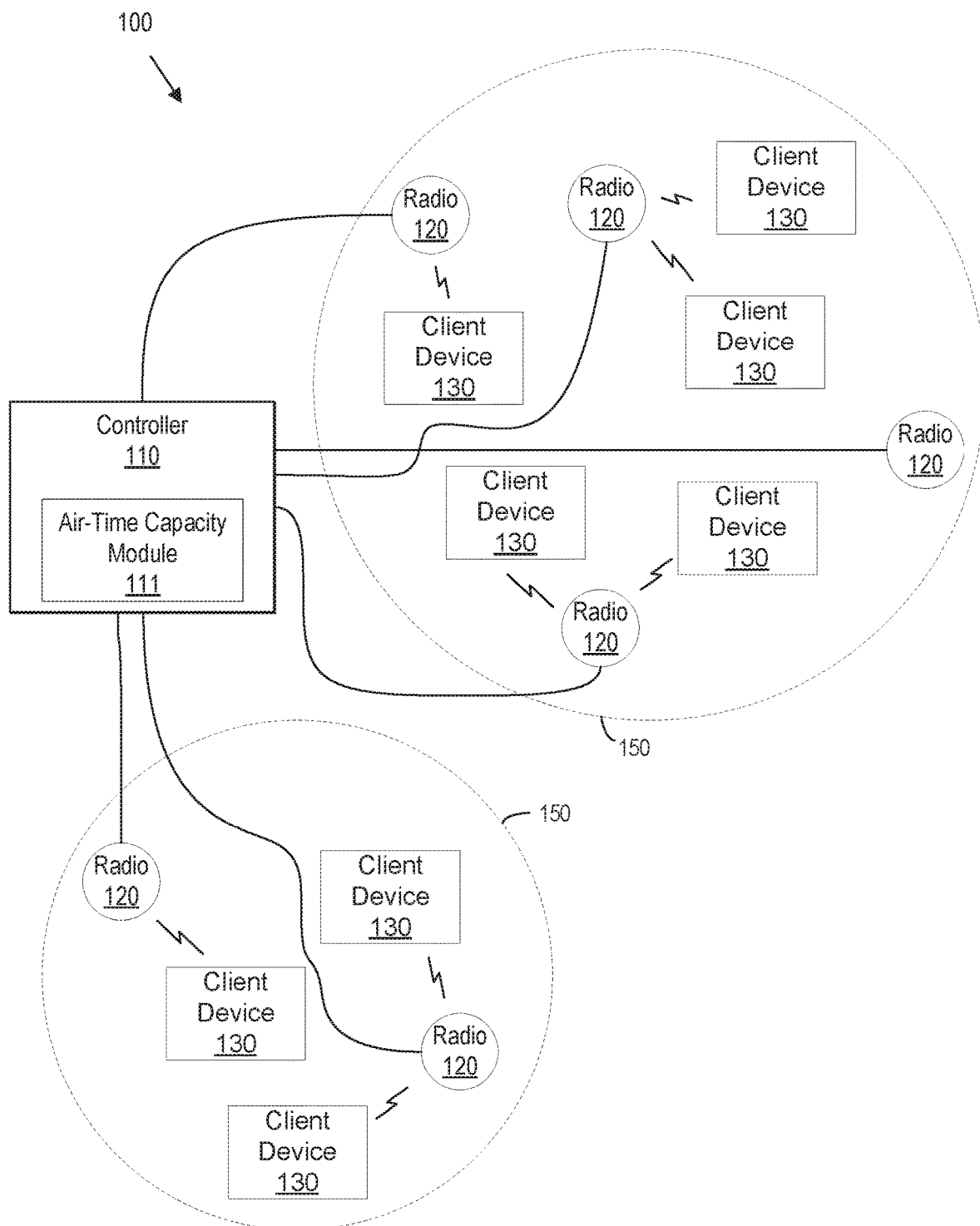
FIG. 2 is another block diagram of an example network.

FIGS. 1 and 2 are block diagrams of an example wireless network 100. Wireless network 100 may be a wireless local-area network (e.g., a Wi-Fi), a cellular network, a satellite network, or any other type of wireless network compatible with the various examples discussed herein. Network 100 may include a plurality of radios 120, where each radio 120 may be, for example, a module of an access point, such as a Wi-Fi router. In some examples, two or more radios 120 may be included in (or integrated into) the same access point. For example, a wireless router may include two radios 120, each associated with a different main frequency (e.g., 2.4 GHz and 5 GHz).

Each radio 120 may communicate with a number of client devices 130 through at least one wireless channel. Each client device 130 may be any type of electronic device or a combination of electronic devices capable of wirelessly communicating with a radio 120. For example, client devices 130 may include mobile electronic devices such as laptops, tablets, smartphones, and so forth, as well as stationary computing devices such as desktop computers, gaming consoles, televisions, printing devices, and so forth. In some examples, after establishing a wireless communication with one radio 120, client device 130 may end the wireless communication, and establish a wireless communication with another radio 120, such as a radio 120 from which client device 130 receives the strongest signal.

In some examples, each radio 120 may be associated with a maximum bandwidth it can support. The maximum bandwidth may be defined, for example, by hardware constraints, regulatory requirements, user configuration, and other factors. Different radios 120 may be associated with different maximum bandwidths. In some examples, the maximum bandwidth of each radio 120 may be defined in terms of a maximum number of wireless sub-channels (e.g., 20 MHz sub-channels) that the radio 120 can support. For example, some radios 120 may support up to one, two, four, or eight 20 MHz sub-channels (or a maximum bandwidth of 20 MHz, 40 MHz, 80 MHz, or 160 MHz). In some examples, a radio 120 may be configured (e.g., by controller 110) to operate at a bandwidth lower than its maximum bandwidth. For example, a radio 120 that supports a maximum bandwidth of 80 MHz may be configured to operate at a bandwidth of 20 MHz, 40 MHz, or 80 MHz.

In some examples, radios 120 may be grouped into one or more domains 150, where radios 120 in one domain 150 may not be communicatively coupled to radios 120 in another domain 150. For example, one domain 150 may be physically separated from another domain 150 such that signals from radios 120 in the first domain cannot reach radios 120 in the other domain 150, and vice versa. Different domains 150 may correspond, for example, to different buildings, different sections or floors of the same building, and so forth.

In some examples, the plurality of radios 120 may be communicatively coupled to a controller 110, either via a cable (e.g., via Ethernet connection) or wirelessly (e.g., via WV-Fi). Controller 110 may include one or more electronic devices of any type, and may be implemented as any combination of hardware and programming. In some examples, controller 110 may be further communicatively coupled to other devices, such as a switch or a router (not shown in FIGS. 1 and 2 for brevity), and may transfer data from the other devices to the radios, and vice versa. In addition, as discussed in more detail below, controller 110 may obtain various data from radios 120 and based on that data, configure radios 120, where configuring radios 120 may include, among other things, assigning to radios 120 particular wireless channels having particular bandwidths.

In some examples, controller 110 may evaluate a particular assignment of wireless channels to radios 120 in terms of combined air time available to radios 120. Evaluating the channel assignment may include evaluating the current channel assignment of network 100 currently in operation, as well as evaluating an alternative channel assignment to network 100. Thus, controller 100 may measure the combined air-time capacity of network 100 currently operating with a certain channel assignment; estimate a combined air-time capacity of network 100 having an alternative channel assignment; and if the latter exceeds the former, re-assign the wireless channels of radios 120 in accordance with the alternative channel assignment. In some examples, controller 110 may periodically re-evaluate the current channel assignment and a number of alternative channel assignments, determine the best channel assignment in terms of combined air-time capacity, and apply the best channel assignment to radios 120 of network 100.

In some examples, controller 110 may calculate the combined air-time capacity of all radios 120 of network 100 (also referred to herein as "system capacity") based on a set of domain capacities, each domain capacity representing the total air-time capacity of all radios 120 within a given domain 150. For example, system capacity $C_{system}$ may be determined as follows:

$$C_{system} = \sum_i C_d^i$$

where $C_d^i$ represents the total capacity of domain i, which may be calculated as a sum of air-time capacities of all radios within the domain:

$$C_d^i = \sum_{j \in d_i} C_r^j$$

where $C_r^j$ represents the air-time capacity (hereinafter, "capacity") of radio j. It is appreciated that in some examples, controller 110 may directly calculate the system capacity as a sum of capacities of all radios within network 100, as follows:

$$C_{system} = \sum_j C_r^j$$

It is also appreciated that in other examples, the combined air-time capacity may be calculated based on the radio capacities using a different function, which may be a linear function (e.g., a weighted average) or a non-linear function.

In order to determine the capacity of a given radio 120, controller 110 may first determine the bandwidth of the radio 120. In some examples, if controller 110 is evaluating the current channel assignment of network 100 in operation, controller 110 may determine the actual bandwidth of radio 120, i.e., the bandwidth at which the radio 120 currently operates. If, however, controller 110 is evaluating an alternative channel assignment, controller 110 may determine a set of available bandwidths at which the radio 120 can operate, calculate the capacity of the radio 120 for each bandwidth in the set, and determine which set that results in the highest capacity. For example, if controller 110 determines that radio j supports a maximum bandwidth of 80 MHz and can operate at 20 MHz, 40 MHz, or 80 MHz, controller 110 may calculate capacity $C_r^j$ of radio j as follows:

$$C_r^j = \max(C_{r,80}^j, C_{r,40}^j, C_{r,20}^j)$$

where $C_{r,80}^j$, $C_{r,40}^j$, and $C_{r,20}^j$ represent capacities of radio j operating at 80 MHz, 40 MHz, and 20 MHz, respectively.

In order to calculate capacity $C_{r,b}^j$ of radio j operating at a wireless channel having a primary channel pchan and bandwidth b, controller 110 may first determine a set of sub-channels CSET(pchan, b) included in that channel, where each sub-channel may be, for example, a 20 MHz sub-channel. To illustrate, CSET(153, 80 MHz) may include 20 MHz sub-channels {149, 153, 157, 161}, and CSET(153, 40 MHz) may include 20 MHz sub-channels {149, 153}.

After determining the set of sub-channels included in a wireless channel, controller 110 may calculate the capacity of each sub-channel. The capacity of a sub-channel may be defined, for example, as the maximum portion (e.g., percentage) of time the sub-channel may be used by the radio 120 for communications between the radio 120 and client devices 130 associated with the radio 120. Accordingly, in some examples, the capacity of a sub-channel may be determined by determining the amount of time that the radio 120 uses the sub-channel for "overhead" communications, i.e., communications other than communications between the radio 120 and client devices 130 associated with the radio 120.

Overhead communications may include, for example, transmissions by the radio 120 to devices other than client devices 130 associated with the radio 120, using the sub-channel in question. These transmissions may include, for example, responses to probes sent by client devices 130 unassociated with the radio. The amount of such transmissions may be referred to as $Tx_b$. $Tx_b$ may be measured by the radio 120 and provided to controller 110.

Overhead communications may also include in-network co-channel interferences, such as interferences caused by radios 120 and client devices 130 that are included in network 100 and are communicatively coupled to controller 110. The amount of such interferences may be referred to as $Rx_b$. If controller 110 is evaluating the current channel assignment, radio 120 may measure $Rx_b$ and provide the value to controller 110.

However, if controller 110 is evaluating an alternative channel assignment, the measured value $Rx_b$ may not accurately represent the value of $Rx_b$ that a particular sub-channel will have if an alternative assignment is applied to network 100, because the value $Rx_b$ may depend on a particular channel assignment. Accordingly, in some examples, a radio 120 may estimate the value of $Rx_b$ that the radio 120 will have if the alternative channel assignment is applied to network 100. In some examples, $Rx_b$ may be estimated based on measured interference caused by those radios 120 within network 100 that are neighbors of the radio 120 (e.g., radios 120 whose signal can reach the radio 120) and that under the alternative assignment will share the sub-channel with the radio 120. For example, the following formula may be used to estimate $Rx_{b,xi}^j$, i.e., $Rx_b$ of sub-channel xi of radio j:

$$Rx_{b,xi}^j = \sum_{k \in INbr(xi)} ICCI_{xi,j}^k$$

where INbr(xi) represents a set of radios 120 within network 100 that are neighbors of radio j and that will use sub-channel xi under the alternative channel assignment, and where $ICCI_{xi,j}^k$ represents the in-network co-channel interference sub-channel xi induced by radio k, as measured by radio j.

In some examples, radio 120 may measure the value of in-network co-channel interference of a particular neighbor radio 120, for example, by scanning a plurality of sub-channels and determining which radios 120 are transmitting on which sub-channels, for example, based on the basic service set identification (BSSID) numbers associated with the transmissions. In some examples, radio 120 may only obtain the aggregate value of in-network co-channel interferences, without being able to measure the individual contributions of the various radios 120 to aggregate value. In these examples, it may be assumed that each radio 120 contributes an equal amount of interference, and therefore $ICCI_{xi,j}^{k}$ may be calculated as the aggregated interference divided by the number of neighbor radios 120.

Furthermore, in some examples, radio 120 may be unable to determine the amount of in-network co-channel interference (ICCI) with sufficient fidelity and accuracy, but it may determine, with high fidelity, the received signal strength indicator (RSSI) of the neighboring radios. Accordingly, in some examples, radio 120 may determine whether the fidelity of RSSI measurements is higher than the fidelity of ICCI measurements, and if so, radio 120 may use RSSI measurements to estimate ICCI contribution of the various neighbor radios 120. For example, the contribution of each neighbor radio 120 to the total ICCI may be a linear function of its RSSI (e.g., with minimum and maximum caps) or any other function of RSSI.

Overhead communications may also include out-of-network co-channel interferences, such as interferences caused by radios 120 and client devices 130 that are not included in network 100, and are not communicatively coupled to controller 110. The amount of such interferences may be referred to as $Rx_c$. If controller 110 is evaluating the current channel assignment, radio 120 may measure $Rx_c$ and provide the value to controller 110.

However, if controller 110 is evaluating an alternative channel assignment, the measured value $Rx_c$ may not accurately represent the value of $Rx_b$ that a particular sub-channel will have if an alternative assignment is applied to network 100, because the value $Rx_c$ (like $Rx_b$) may depend on a particular channel assignment. Accordingly, in some examples, the radio 120 may estimate the value of $Rx_c$ that the radio 120 will have if the alternative channel assignment is applied to network 100. In some examples, $Rx_c$ may be estimated based on measured interference caused by those any radios 120 outside of network 100 that are neighbors of the radio 120 and that share the sub-channel assigned to the radio 120 under the alternative assignment. For example, the following formula may be used to estimate $Rx_{c,xi}^{j}$, i.e., $Rx_c$ of sub-channel xi of radio j:

$$Rx_{c,xi}^{j} = \sum_{k \in ONbr(xi)} OCCI_{xi,j}^{k}$$

where ONbr(xi) represents a set of radios 120 outside of network 100 that are neighbors of radio j and that are using sub-channel xi that will be assigned to the radio 120 under the alternative channel assignment, and where $OCCI_{xi,j}^{k}$ represents the out-of-network co-channel interference as measured by radio j on sub-channel xi by radio k.

Overhead communications may also include out-of-standard interferences, such as interferences caused by devices communicating using standards or protocols different than those of network 100. For example, if network 100 is a Wi-Fi network, out-of-standard interferences may include any non-Wi-Fi interference, such as microwave interference, adjacent-channel interference (ACI), Bluetooth interference, and so forth. The amount of such interferences may be referred to as $Rx_d$. The value of $Rx_d$ may be measured by the radio 120 and provided to controller 110.

After measuring and/or estimating the various overhead communications associated with a particular sub-channel, controller 110 may determine the capacity of the sub-channel based on any combination of one or more of those parameters. For example, controller 110 may calculate the capacity of sub-channel xi of radio j as follows:

$$C_{xi}^{j} = 100 - (Tx_{b,xi}^{j} + Rx_{b,xi}^{j} + Rx_{c,xi}^{j} + Rx_{d,xi}^{j})$$

where each of the parameters $Tx_{b,xi}^{j}$, $Rx_{b,xi}^{j}$, $Rx_{c,xi}^{j}$, and $Rx_{d,xi}^{j}$ are represented as percentages of time spent by radio j on the respective overhead communication. In general, it is appreciated that in some examples, the various amounts discussed above (e.g., $Tx_a$, $Rx_a$, $Tx_b$, $Rx_b$, $Rx_c$, and $Rx_d$) may be measured, calculated, and represented, for example, in terms of absolute amounts of air-time or in terms of portions (e.g., percentages) of air-time spent by radio 120 on the respective communications via the sub-channel. In other examples, the amounts may be represented in terms of absolute number of frames or packets, or in terms of portions (e.g., percentages) of frames or packets processed by radio 120 on the respective communications via the sub-channel.

After calculating the capacity of each sub-channel xi of radio j, controller 110 may then calculate capacity $C_{r,b}^{j}$ of radio j for each possible bandwidth b supported by the radio, based on the determined capacities of the sub-channels. In some examples, $C_{r,b}^{j}$ may be calculated as follows:

$$C_{r,b}^{j} = \min(C_{x1}^{j}, C_{x2}^{j}, \ldots C_{xN}^{j}) * \left(\frac{b}{b_{sub}}\right)$$

where $C_{x1}^{j}$-$C_{xN}^{j}$ are capacities of all sub-channels xi in bandwidth b, and $b_{sub}$ is the bandwidth of each sub-channel (e.g., 20 MHz). To illustrate, radio j supports a bandwidth of 80 MHz and may be assigned a primary channel of 40, in which case the channel may include four 20 MHz sub-channels 36, 40, 44, and 48, whose capacities are, for example, 93, 85, 80, and 67, respectively. In this example, the following three bandwidth-specific capacities may be calculated for radio j:

$$C_{r,20}^{j} = \min(85) * 1 = 85,$$

$$C_{r,40}^{j} = \min(93,85) * 2 = 170,$$

$$C_{r,80}^{j} = \min(93,85,80,67) * 4 = 268,$$

and the resulting capacity of radio j may then be calculated as the maximum of the bandwidth-specific capacities: $C_r^{j} = \max(85,170,268) = 268$.

Alternatively, in some examples, $C_{AP,b}^{j}$ may be calculated as follows:

$$C_{r,b}^j = \begin{cases} \left(100 - \sum_{ch \in CSET(pchan_j,b)} (100 - C_{ch}^j)\right) * \left(\dfrac{b}{b_{sub}}\right) & \text{if } \sum_{ch \in CSET(pchan_j,b)} (100 - C_{ch}^j) < 100 \\ 0 & \text{otherwise} \end{cases}$$

Using the 80 MHz-channel example above, the following three bandwidth-specific capacities may be calculated for radio j using this alternative formula:

$C_{r,20}^j = 85$, $C_{r,40}^j = ((100-(7+15))*2) = 156$, and $C_{r,80}^j = ((100-(7+15+20+33))*4) = 100$, and the resulting capacity of radio j may be calculated as the maximum of the bandwidth-specific capacities: $C_r^j = \max(85, 156, 100) = 156$.

As discussed above, after calculating the capacities of all radios 120, controller 110 may calculate the combined (system) capacity, for example, by summing up the capacities of all radios 120, or by first determining total capacity of each domain 150 and then summing up the total capacities of all domains 150. After determining the combined system capacity, controller 110 may determine compare it, for example, to combined system capacities calculated for other channel assignments, select the channel assignment resulting in the maximum combined system capacity, and apply that channel assignment to network 100. Applying the channel assignment to network 100 may include assigning, to each radio 120, a wireless channel corresponding to the channel assignment. In addition, in some examples, applying the channel assignment to network 100 may include configuring each radios 120 to operate at a bandwidths that was determined to result in maximum air-time capacity of that radio 120, as discussed above. It is appreciated that in some examples only some of radios 120 are assigned new wireless channels and/or new operational bandwidth, for example, if other radios 120 are determined to be already using the channel and bandwidth corresponding to the selected channel assignment.

In some examples, during evaluation of a channel assignment, controller 110 may disregard various outlier values upon a determination that the values are not representative. For example, controller 110 may disregard measurements that occurred during non-representative times (e.g., weekends, nights, and so forth).

While in the examples above some calculations are described as being performed by controller 110, it is appreciated that some or all of those calculations may in other examples be performed by one or more radios 120 or other devices communicatively coupled to controller 110. Similarly, some calculations are described above as being performed by a particular radio 120, but it is appreciated that some or all of those calculations may in other examples be performed by other radios 120 and/or by controller 110. For example, radio 120 may perform some measurements and/or calculations, and provide them to controller 110, which may then perform additional calculations.

As mentioned above, in some examples, controller 110 may be implemented as any combination of hardware and programming. For example, the programming may include processor-executable instructions stored on a tangible, non-transitory computer-readable medium, and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like. In another example, the engines may be implemented by hardware logic in the form of electronic circuitry, such as application specific integrated circuits.

Figure 3:
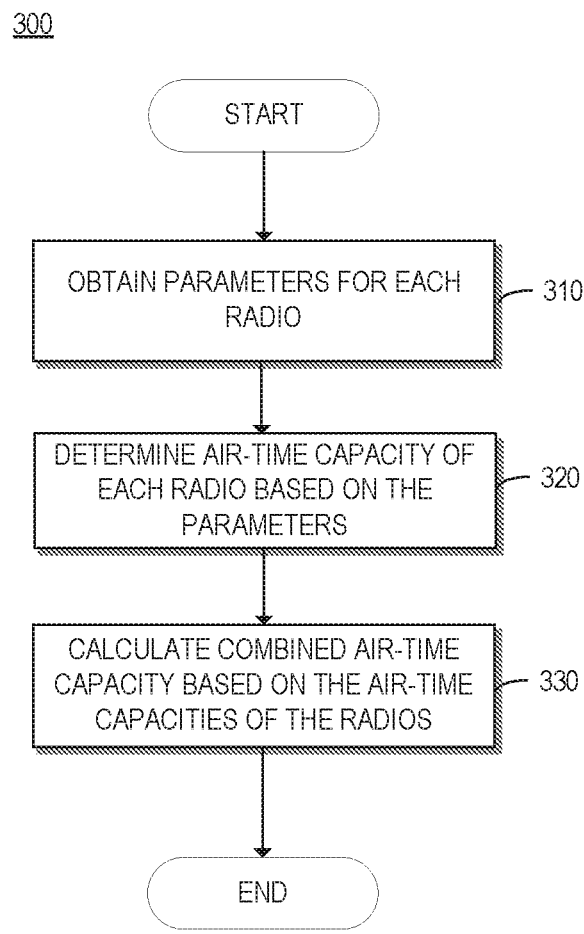
FIG. 3 shows a flowchart of an example method.

FIG. 3 is a flowchart of an example method 300 for determining data reliability. Method 300 may be described below as being executed or performed by a system or by one or more devices such as controller 110 and/or one or more radios 120. Other suitable systems may be used to execute or perform the method as well. Method 300 may be implemented in the form of executable instructions stored on at least one non-transitory machine-readable storage medium of the system and executed by at least one processor of the system. Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

At block 310, the method may obtain, for each radio in a plurality of radios included in a network, a set of parameters associated with the radio's communication through a wireless channel associated with the radio. As discussed above, the set of parameters may include at least one of (e.g., any combination of) the following parameters: amount of transmissions by the radio to devices other than client devices associated with the radio, amount of in-network co-channel interference received by the radio from other devices within the network, amount of out-of-network co-channel interference received by the radio from devices not within the network, an amount of out-of-standard interference. At block 320, the method may determine, for each radio in the plurality of radios, an air-time capacity of the radio based on the set of parameters. As discussed above, in some examples, the radio may support communications through a set of sub-channels associated with the wireless channel, in which case determining the air-time capacity of the radio may include determining a sub-channel capacity of each of the set of sub-channels based on the set of parameters, and in some examples, identifying, within the set of sub-channels, a subset of sub-channels having a highest combined sub-channel capacity. At block 330, the method may calculate the combined air-time capacity based on the air-time capacity of each of the plurality of radios.

Figure 4:
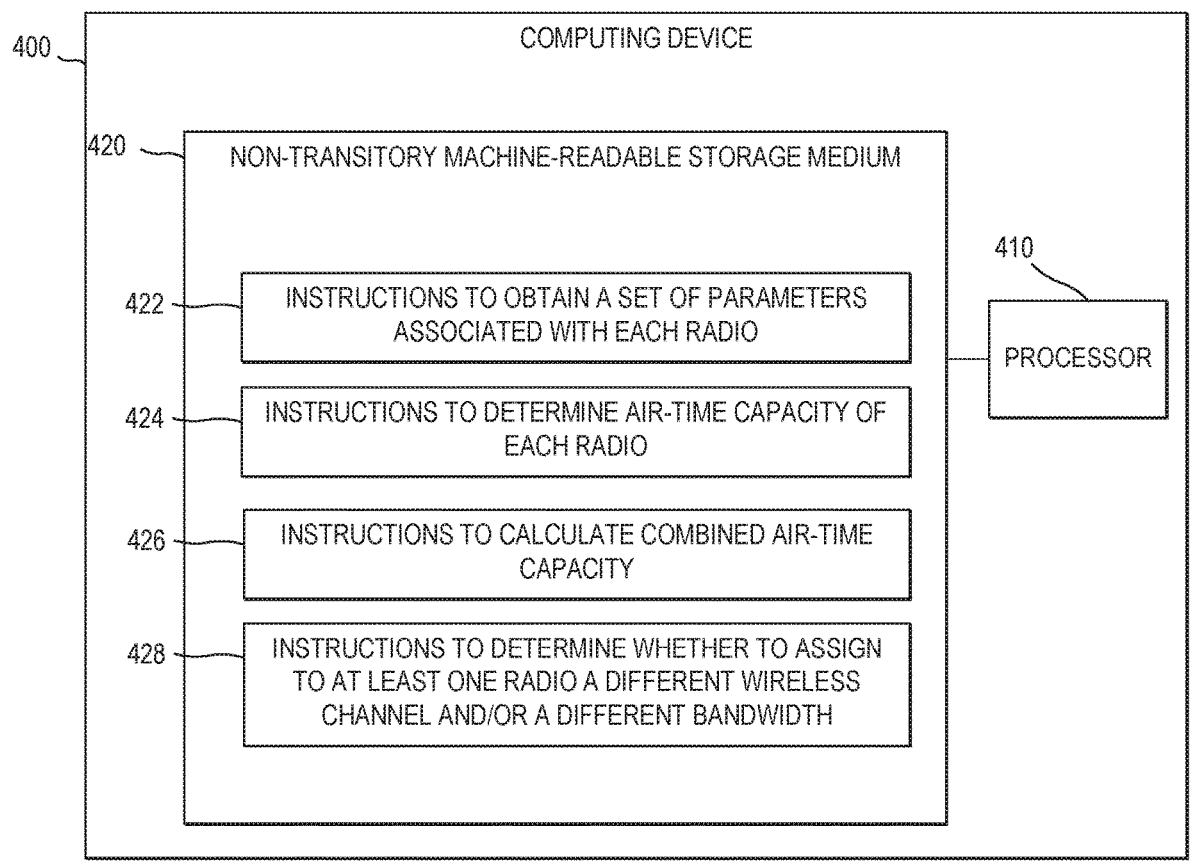
FIG. 4 is a block diagram of an example computing device.

As discussed above, in some examples, the method may also include determining, based on the combined air-time capacity, whether to assign a different wireless channel to at least one of the plurality of radios. The method may further include calculating an estimated value of the amount of in-network co-channel interference based on at least one of: co-channel interferences induced by the plurality of radios, as measured by the radio; and received signal indicators of the plurality of radios, as measured by the radio. In addition, the method may include calculating an estimated value of the amount of out-of-network co-channel interference based on interferences induced by radios not from the plurality of radios, as measured at the radio FIG. 4 is a block diagram of an example computing device 400. Computing device 400 may be similar, for example, to controller 110 of FIGS. 1 and 2. In the example of FIG. 4, computing device 400 includes a processor 410 and a non-transitory machine-readable storage medium 420. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 410 may be one or more central processing units (CPUs), microprocessors, and/or other hardware devices suitable for retrieval and execution of instructions stored in non-transitory machine-readable storage medium 420. In the particular example shown in FIG. 4, processor 410 may fetch, decode, and execute instructions 422, 424, 426, 428, or any other instructions not shown for brevity. As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 420 may be any electronic, magnetic, optical, or other physical storage device that stores executable instructions. Thus, medium 420 may be, for example, Random Access Memory (RAM), an Electrically-Erasable Programmable Read-Only Memory (EEPROM), a storage drive, an optical disc, and the like. Medium 420 may be disposed within computing device 400, as shown in FIG. 4. In this situation, the executable instructions may be "installed" on computing device 400. Alternatively, medium 420 may be a portable, external or remote storage medium, for example, that allows computing device 400 to download the instructions from the portable/external/remote storage medium. In this situation, the executable instructions may be part of an "installation package." As described herein, medium 420 may be encoded with executable instructions for finding a network device on a network.

Referring to FIG. 4, instructions 422, when executed by a processor, may cause a computing device to obtain a set of parameters associated with each radio in the plurality of radios of a wireless network. Instructions 424, when executed by a processor, may cause the computing device to determine an air-time capacity of each radio based on the set of parameters associated with the radio. Instructions 426, when executed by a processor, may cause the computing device to calculate a combined air-time capacity of the plurality of radios based on the air-time capacity of each of the plurality of radios. Instructions 428, when executed by a processor, may cause the computing device to determine, based on the combined air-time capacity, whether to assign to at least one of the plurality of radios at least one of: a different wireless channel and a different bandwidth. As discussed above, in some examples, at least one radio of the plurality of radios may support a plurality of bandwidths, in which additional instructions (not shown for brevity), when executed by the processor, may cause the computing device to determine which of the plurality of bandwidths maximizes the air-time capacity of the at least one radio.

What is claimed is:

1. A controller communicatively coupled to a plurality of radios, each radio being associated with a wireless channel and each radio capable of supporting a plurality of bandwidths, wherein the controller is to:

for each radio in the plurality of radios, obtain a set of parameters associated with the radio's communication through the wireless channel associated with the radio, wherein at least one radio in the plurality of radios supports communications through a set of sub-channels associated with the wireless channel;

determine an air-time capacity of the radio based on the set of parameters, wherein determining an air-time capacity of the at least one radio based on the set of parameters further comprises:

quantifying a sub-channel capacity of each of the set of sub-channels based on the set of parameters, calculating bandwidth-specific capacities for the at least one radio for each bandwidth in the plurality of bandwidths supported by the at least one radio based on the quantified sub-channel capacities, and designating the air-time capacity of the at least one radio in the plurality of radios as a maximum of the bandwidth-specific capacities;

calculate a combined air-time capacity of the plurality of radios based on the air-time capacity of each of the plurality of radios; and based on the combined air-time capacity, determine whether to assign a different wireless channel to at least one of the plurality of radios, wherein the set of parameters comprises at least one of: an amount of transmissions by the radio to devices other than client devices associated with the radio, an amount of in-network co-channel interference received by the radio from devices communicatively coupled to the controller, an amount of out-of-network co-channel interference received by the radio from devices not communicatively coupled to the controller, and an amount of out-of-standard interference.

2. The controller of claim 1, wherein the set of parameters comprises at least the amount of in-network co-channel interference, and wherein the controller is to calculate an estimated value of the amount of in-network co-channel interference based on at least one of: co-channel interferences induced by the plurality of radios, as measured by the radio, and received signal indicators of the plurality of radios, as measured by the radio.

3. The controller of claim 1, wherein the set of parameters comprises at least the amount of out-of-network co-channel interference, and wherein the controller is to calculate an estimated value of the amount of out-of-network co-channel interference based on interferences induced by radios not from the plurality of radios, as measured at the radio.

4. The controller of claim 1, wherein determining the air-time capacity of the radio comprises identifying, within the set of sub-channels, a subset of sub-channels having a highest combined sub-channel capacity.

5. A method for determining a combined air-time capacity of a network comprising a plurality of radios, each radio being associated with a wireless channel and each radio capable of supporting a plurality of bandwidths, the method comprising:
obtaining, for each radio in the plurality of radios, a set of parameters associated with the radio's communication through the wireless channel associated with the radio, wherein at least one radio in the plurality of radios supports communications through a set of sub-channels associated with the wireless channel;
determine an air-time capacity of the radio based on the set of parameters, wherein determining an air-time capacity of the at least one radio based on the set of parameters further comprises:
quantifying a sub-channel capacity of each of the set of sub-channels based on the set of parameters,
calculating bandwidth-specific capacities for the at least one radio for each bandwidth in the plurality of bandwidths supported by the at least one radio based on the quantified sub-channel capacities, and
designating the air-time capacity of the at least one radio in the plurality of radios as a maximum of the bandwidth-specific capacities; and
calculating the combined air-time capacity based on the air-time capacity of each of the plurality of radios,
wherein the set of parameters comprise at least one of: an amount of transmissions by the radio to devices other than client devices associated with the radio, an amount of in-network co-channel interference received by the radio from other devices within the network, an amount of out-of-network co-channel interference received by the radio from devices not within the network, and an amount of out-of-standard interference.

6. The method of claim 5, further comprising: based on the combined air-time capacity, determining whether to assign a different wireless channel to at least one of the plurality of radios.

7. The method of claim 5, wherein the set of parameters comprises at least the amount of in-network co-channel interference, the method further comprising:
calculating an estimated value of the amount of in-network co-channel interference based on at least one of: co-channel interferences induced by the plurality of radios, as measured by the radio, and received signal indicators of the plurality of radios, as measured by the radio.

8. The method of claim 5, wherein the set of parameters comprises at least the amount of out-of-network co-channel interference, the method further comprising:
calculating an estimated value of the amount of out-of-network co-channel interference based on interferences induced by radios not from the plurality of radios, as measured at the radio.

9. The method of claim 5, wherein determining the air-time capacity of the radio comprises identifying, within the set of sub-channels, a subset of sub-channels having a highest combined sub-channel capacity.

10. A non-transitory machine-readable storage medium encoded with instructions executable by a processor of a computing device to cause the computing device to:
obtain a set of parameters associated with each radio in the plurality of radios of a wireless network, each radio being associated with a wireless channel and each radio configured to support a plurality of bandwidths, wherein at least one radio in the plurality of radios supports communications through a set of sub-channels associated with the wireless channel;
determine an air-time capacity of the radio based on the set of parameters, wherein determining an air-time capacity of the at least one radio based on the set of parameters further comprises:
quantifying a sub-channel capacity of each of the set of sub-channels based on the set of parameters,
calculating bandwidth-specific capacities for the at least one radio for each bandwidth in the plurality of bandwidths supported by the at least one radio based on the quantified sub-channel capacities, and
designating the air-time capacity of the at least one radio in the plurality of radios as a maximum of the bandwidth-specific capacities;
calculate a combined air-time capacity of the plurality of radios based on the air-time capacity of each of the plurality of radios; and
based on the combined air-time capacity, determine whether to assign to at least one of the plurality of radios at least one of: a different wireless channel and a different bandwidth,
wherein the set of parameters comprises at least one of: an amount of transmissions by the radio to devices other than client devices associated with the radio, an amount of in-network co-channel interference received by the radio from devices associated with the wireless network, an amount of out-of-network co-channel interference received by the radio from devices not associated with the wireless network, and an amount of out-of-standard interference.

11. The non-transitory machine readable medium of claim 10, wherein the set of parameters comprises at least the amount of in-network co-channel interference, and wherein the instructions executable by the processor to cause the computing device to: calculate an estimated value of the amount of in-network co-channel interference based on at least one of: co-channel interferences induced by the plurality of radios, as measured by the radio, and received signal indicators of the plurality of radios, as measured by the radio.

12. The non-transitory machine readable medium of claim 10, wherein the set of parameters comprises at least the amount of out-of-network co-channel interference, and wherein the instructions comprise instructions executable by the processor to cause the computing device to: calculate an estimated value of the amount of out-of-network co-channel interference based on interferences induced by radios not from the plurality of radios, as measured at the radio.

13. The non-transitory machine readable medium of claim 10, wherein the instructions to determine the air-time capacity of the radio comprise identifying, within the set of sub-channels, a subset of sub-channels having a highest combined sub-channel capacity.

* * * * *